(12) United States Patent
Kushalnagar et al.

(10) Patent No.: US 7,734,801 B2
(45) Date of Patent: Jun. 8, 2010

(54) METHOD AND APPARATUS FOR ACQUIRING INTERNET REAL-TIME MEDIA CHANNELS IN A PRIVATE NETWORK

(75) Inventors: Nandakishore R. Kushalnagar, Portland, OR (US); Ajay Garg, Portland, OR (US); Francis M. Tharappel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1305 days.

(21) Appl. No.: 10/850,096

(22) Filed: May 20, 2004

(65) Prior Publication Data

US 2005/0262082 A1    Nov. 24, 2005

(51) Int. Cl.
*G06F 15/16* (2006.01)

(52) U.S. Cl. .................. 709/231; 709/219; 709/200

(58) Field of Classification Search ............... 709/248, 709/231, 219, 226, 200
See application file for complete search history.

(56) References Cited

U.S. PATENT DOCUMENTS 6,215,483 B1 * 4/2001 Zigmond .................... 725/112
6,330,719 B1 * 12/2001 Zigmond et al. ............. 725/121
6,571,392 B1 * 5/2003 Zigmond et al. ............. 725/110
7,099,277 B2 * 8/2006 Sahinoglu et al. ........... 370/238

* cited by examiner

*Primary Examiner*—Salad Abdullahi
*Assistant Examiner*—El Hadji M Sall
(74) *Attorney, Agent, or Firm*—Crystal D. Sayles

(57) ABSTRACT

An apparatus and method for acquiring Internet real-time media channels in a private network. The method includes receiving a service advertisement from a media channel server. The media channel server acts as a gateway between one or more channel service providers and a plurality of rendering devices on a private network. A subscription identifier (ID) and a URI (Universal Resource Identifier) are sent to the media channel server to enable the media channel server to request Internet channel information from one or more channel service providers. If the subscription identifier (ID) is validated by the one or more channel service providers, the Internet channel information is provided from the one or more channel service providers via the media channel server. The Internet channel information is provided to a user for enabling the user to browse the Internet channel information and request media content found on at least one Internet channel to be rendered on at least one of the plurality of rendering devices.

22 Claims, 3 Drawing Sheets

METHOD AND APPARATUS FOR ACQUIRING INTERNET REAL-TIME MEDIA CHANNELS IN A PRIVATE NETWORK

FIELD OF THE INVENTION

The present invention is generally related to the field of Internet media distribution. More particularly, the present invention is related to a method and apparatus for acquiring Internet real-time media channels for distribution in a private network.

DESCRIPTION

Conventional methods for streaming media to a home network include streaming digital media from sources, such as, for example, the Internet, to computing devices in the home over a broadband connection, DSL (Digital Subscriber Line), etc. Real-time media is typically distributed over the air from a broadcasting station and received in the home to rendering devices, such as radios and televisions, via antennas or cables attached to the individual rendering devices.

In recent years, the use of digital media of all types, such as digital audio and video, has grown exponentially in popularity. Many rendering devices, such as televisions, radios, stereos, DVD (Digital Versatile Disc) players, DVRs (Digital Video Recorders), etc., are now capable of directly connecting to the Internet via wired or wireless means. Many radio and television broadcasting stations are now deploying a model that enables all media to be streamed into the home via the Internet. The Internet includes, but is not limited to, channel service providers and media content providers. Channel service providers provide channel information, such as information about media, which may include, but is not limited to, URI (Universal Resource Identifier) and media type. Media channel providers stream the media content to the rendering devices in the home. The rendering devices connect to the channel service providers to download the channel information. The rendering devices then use the channel information to render media from the media channel providers.

With this model, each media rendering device must have prior knowledge of the channel service provider URI (Universal Resource Identifier), or require a user interface to enter channel service provider information. When a change occurs with a channel service provider, the change needs to be reflected in each media rendering device. Also, each media rendering device is connected directly to the channel service provider via the Internet, thus leaving each media rendering device open to viruses and other harmful content.

Thus, what is needed is an apparatus and method that decouples the channel service providers from the media rendering devices. What is also needed is an apparatus and method for enabling information from channel service providers to be shared with each media rendering device. What is further needed is an apparatus and method that enables information sharing on any standard protocol.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to an apparatus and method for acquiring Internet real-time media channels in a private network. This is accomplished by employing a media channel server (MCS). In one embodiment, the media channel server may be implemented within a private media server. In other embodiments, the media channel server may be implemented anywhere in the private network. The media channel server acquires channel information from various channel service providers and advertises the information to any rendering device on the private network via a control point. The media channel server seamlessly works with protocols such as, but not limited to, UPnP™ protocols employed by media servers and media renderers, to provide an infrastructure for real-time streaming of media inside a controlled network. This eliminates the need for media renderers to have advanced user interfaces to enter the location of the media content provider (MCP) via the media renderer. Media rendering tasks are now simplified to browsing channels and playing a desired channel.

Embodiments of the present invention are described as being implemented in a home private network (also referred to as a "home network"). The home network is used for descriptive purposes only. One skilled in the relevant art(s) would know that other private networks may also be applicable.

Figure 1:
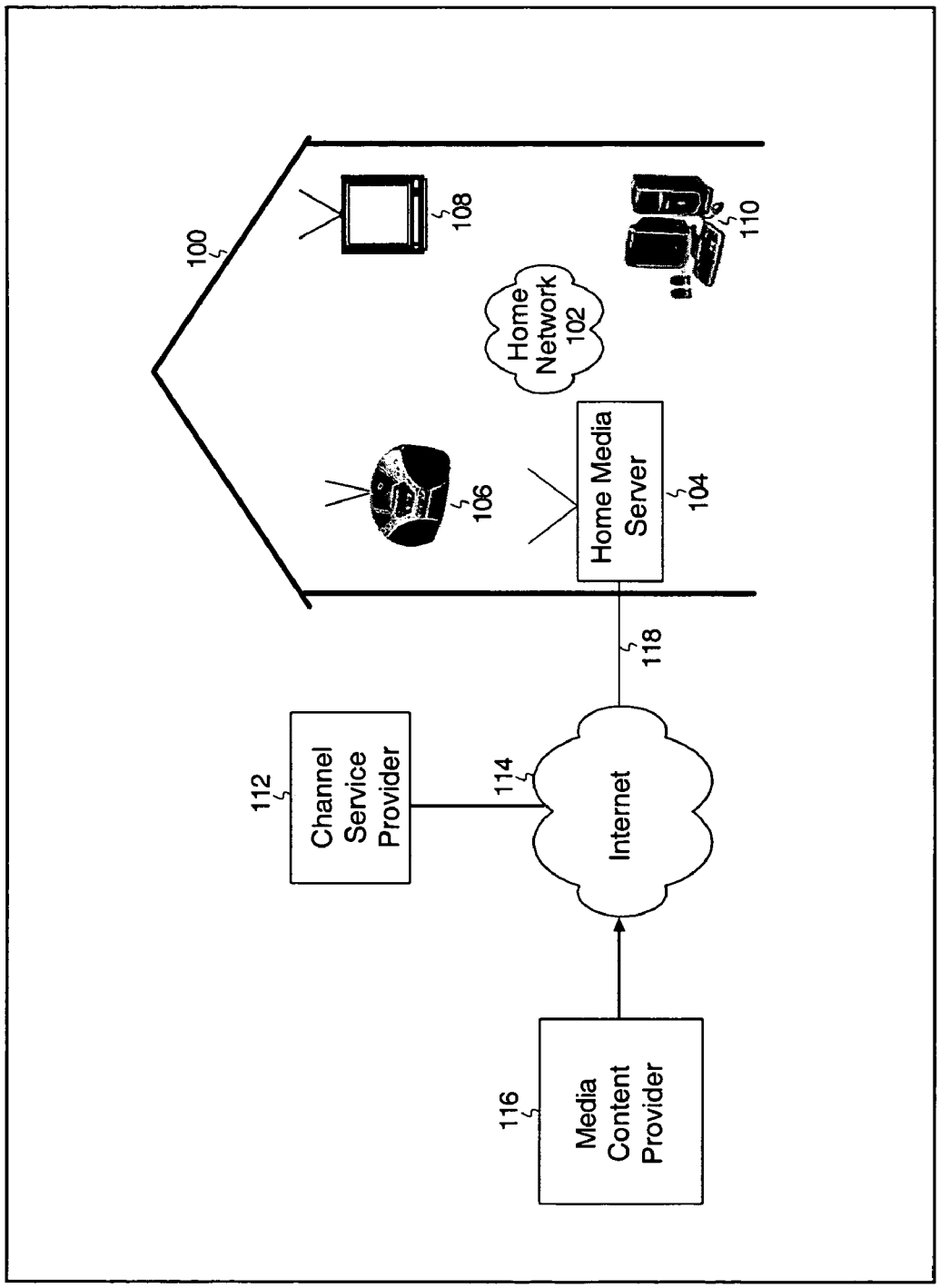
FIG. 1 is a block diagram illustrating an exemplary method for acquiring Internet real-time media channels for a private/home network according to an embodiment of the present invention.

FIG. 1 is a block diagram 100 illustrating an exemplary method for acquiring Internet real-time media channels for a home network according to an embodiment of the present invention. Diagram 100 comprises a home 100 having a home network 102 coupled to a wide area network (WAN), such as Internet 114. Home network 102 may be coupled to Internet 114 using dial-in connections, high-speed cable, digital subscriber lines (DSL), or any other means for connecting home network 102 to Internet 114.

Home network 102 includes, but is not limited to, a home media server 104 and a plurality of rendering devices, such as, for example, a radio 106, a television 108, and a computer 110. Media content may be streamed into home network 102 via Internet 114 for rendering on any one or more of rendering devices 106, 108, and/or 110. Internet 114 includes media content from media content providers, such as, for example, media content provider 116. Internet 114 also includes channel service information from channel service providers, such as, for example, channel service provider 112. Although not explicitly shown, home network 102 may include a media channel server (MCS) to distribute channel information that is available to any rendering device within home network 102. In one embodiment, the media channel server may be implemented in home media server 104. In other embodiments, the media channel server may be implemented on any device within home network 102. The media channel server will be described in more detail below with reference to FIG. 2.

Figure 2:
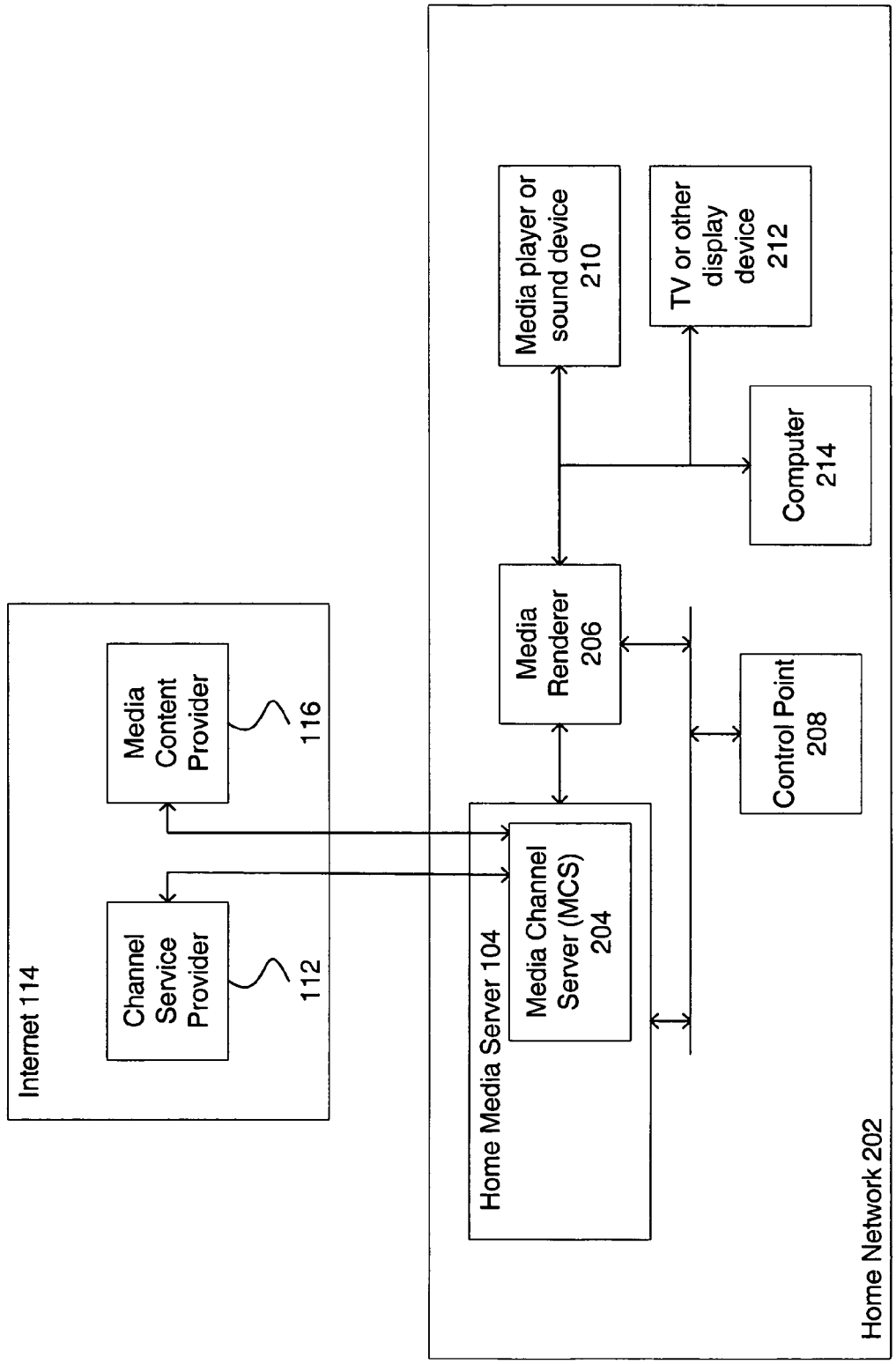
FIG. 2 is a block diagram illustrating an exemplary system architecture incorporating a media channel server (MCS) in a private/home network for acquiring Internet real-time media channels according to an embodiment of the present invention.

FIG. 2 is a block diagram illustrating an exemplary system architecture 200 incorporating a media channel server (MCS) in a home network for acquiring Internet real-time media channels according to an embodiment of the present invention. System architecture 200 comprises home network 202 and Internet 114. Home network 202 is a local area network (LAN) that connects computers, audio/video players, televisions, personal digital assistants (PDAs), etc. using a wired or wireless medium, such as, for example, Ethernet or Bluetooth (or any other wireless protocol based on the IEEE 802.11 standard, IEEE Standards for Information Technology—/Telecommunications and Information Exchange Between Systems, ISO/IEC 8802-11 (1999)), respectively. Home network 202 comprises home media server 104 having a media channel server (MCS) 204, a media renderer 206, a control point 208, and a plurality of media rendering devices, such as, for example, a media player or sound device 210, a TV or other media display device 212, and a personal computer (PC) 214. Media player or sound device 210 may include, but is not limited to, a compact disk (CD) player, a MPEG audio layer 3 (MP3) player, Windows Media Audio (WMA) player, etc. Other media display devices may include, but are not limited to, digital versatile disc (DVD) players, digital video recorders (DVRs), home theater systems, etc.

Home media server 104 is a server located in the home that may contain content or references to content. In one embodiment, home media server 104 may contain an enumeration of all the media items, including a URI of each media item (i.e., where the media may be located) and the type of each media item, such as, for example, music, movies, video games, etc. In another embodiment, home media server 104 may also contain the actual media itself. Applications, such as, but not limited to, browser applications, on home network 202 may be used to browse home media server 104. Home media server 104 may also act as a gateway inside the home. In one embodiment, home media server 104 may include media channel server (MCS) 204 co-located within home media server 104. In an alternative embodiment, media channel server 204 may be located outside of home media server 104. In yet another embodiment, media channel server 204 may be located within any device in home network 202.

Media channel server (MCS) 204 connects to channel service providers on Internet 114, such as channel service provider 116, and downloads all of the channel information provided by the channel service providers. In one embodiment, MCS 204 may organize the channel information into a XML (extensible Markup Language) based format, such as, for example, DIDL (Digital Item Declaration Language). In one embodiment, MCS 204 may choose to classify channels based on music, news, movies, other programming channels, etc.

MCS 204 advertises itself within home network 202 using technologies such as, but not limited to, UPnP™. Advertising allows the control point(s) within home network 202, such as control point 208, to find and use the service. In one embodiment, MCS 204 may be remotely controlled by the control point(s) to download channel information from various channel service providers, such as channel service provider 116. MCS 204 provides the channel information to the control point(s), thereby enabling the control point(s) to program one or more media renderers, such as media renderer 206, with the channel information and media content provider location from which to obtain the media content.

Media renderer 206 is a device that can play digital media or aid in playing digital media available from a wide-area network (WAN), such as Internet 114. In one embodiment, media renderer 206 may be a set-top box. In another embodiment, media renderer 206 may be a media center. In one embodiment, media renderer 206 may be a UPnP™ device, thus enabling media rendering devices 210, 212, and 214 to also be UPnP™ devices. Media renderer 206 is capable of recognizing media, and may stream media from a specified URI.

Control point 208 is a wireless device similar to a remote control, PDA, or any other device that aids in controlling components within a home network, such as home network 202. Control point 208 sends and receives control actions and responses to operate various devices on home network 202, such as, but not limited to, home media server 104, MCS 204, and media renderer 206, and provides information for obtaining media content. Although not shown in FIG. 2, in one embodiment, control point 208 may be integrated with media renderer 206.

As previously indicated, embodiments of the present invention use MCS 204 to distribute Internet channel information to private networks, such as home network 202. MCS 204 acts as a gateway between channel service providers, such as channel service provider 112, and media rendering devices, such as media rendering devices 210, 212, and 214, thereby acting as a single point of contact for providing Internet channel information to home network 202. MCS 204 decouples channel service provider 112 from media rendering devices 210, 212, and 214, and allows any media renderer compatible with MCS 204 to stream media content from a desired media content provider, such as media content provider 116, to media rendering devices 210, 212, and 214.

Figure 3:
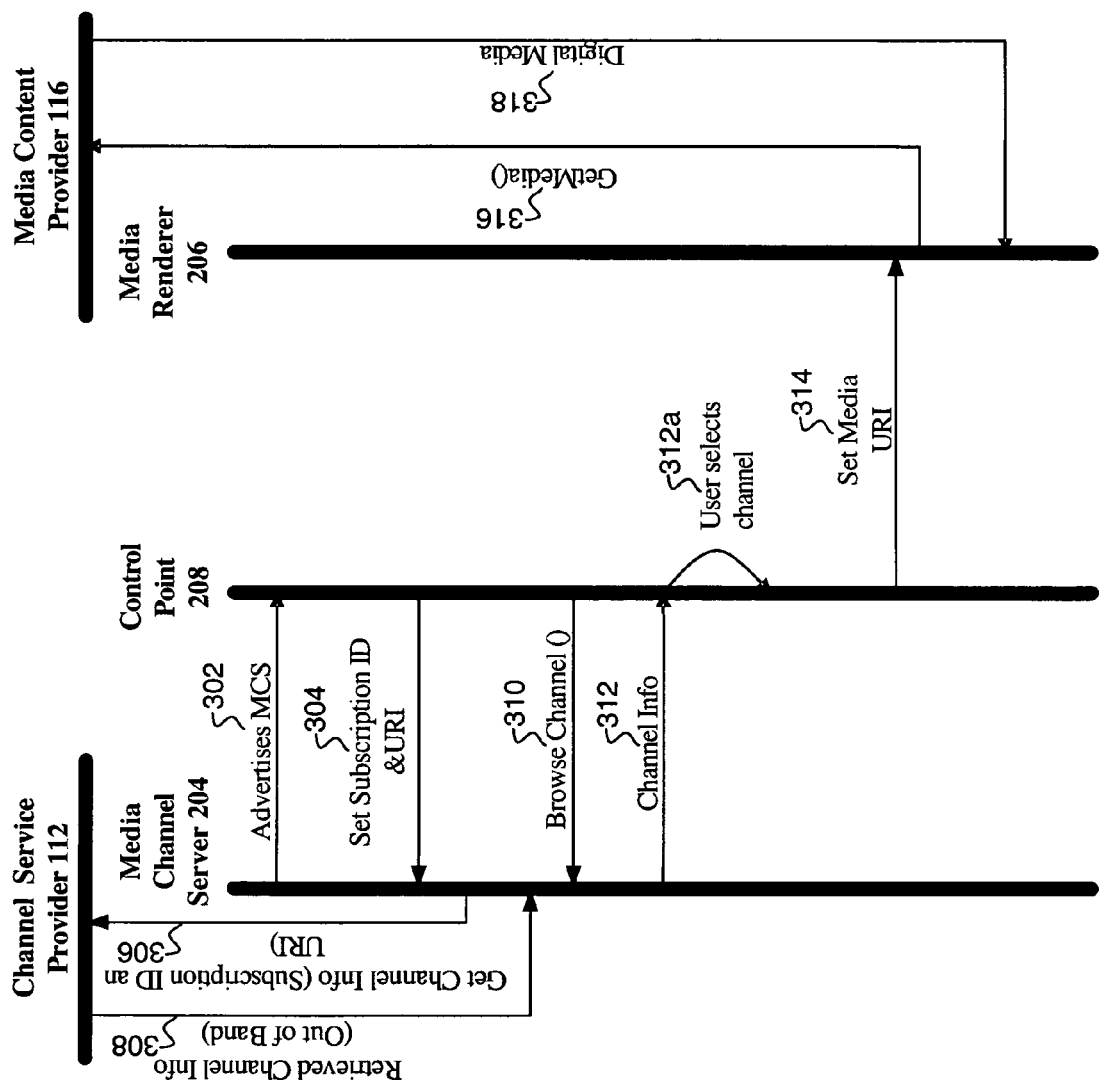
FIG. 3 is an action flow diagram describing an exemplary method for acquiring Internet real-time media channel information using a media channel server and playing media content from a selected media channel via a media renderer in a private/home network according to an embodiment of the present invention.

FIG. 3 is an action flow diagram 300 describing an exemplary method for acquiring Internet channel information using a media channel server (MCS) and playing media content via a media renderer. The invention is not limited to the embodiment described herein with respect to action flow diagram 300. Rather, it will be apparent to persons skilled in the relevant art(s) after reading the teachings provided herein that other functional action flow diagrams are within the scope of the invention. The process is described from the perspective of MCS 204, control point 208, and media renderer 206. The process begins at 302, where MCS 204 advertises its service to control points 208 inside home network 202.

At 304, MCS 204 receives a subscription identifier (ID) and URI from control point 208. The subscription ID allows the channel service provider to determine whether MCS 204 has a valid subscription with channel service provider 112. The URI identifies the location of channel service provider 112 on Internet 114.

At 306, MCS 204 sends a request to channel service provider 112 for Internet channel information using the URI provided by control point 208. The request includes the subscription ID. In an embodiment, the request may be secure depending on the level of support of channel service provider 112. If channel service provider 112 determines that the subscription ID is invalid, then channel service provider 112 will indicate to MCS 204 that the subscription ID is invalid and the process will end. If channel service provider 112 determines that the subscription ID is valid, then MCS 204 receives Internet channel information from channel service provider 112 at 308. In an embodiment, response messages from channel service provider 112 may be secured using protocols, such as, for example, UPnP™ security.

At this point, MCS 204 is provided with all of the channels that channel service provider 112 advertises as well as the type of media content offered by each channel and where to obtain the media content associated with each channel. In one embodiment, MCS 204 may organize the channel information into an XML (extensible Markup Language) based format, such as, for example, DIDL (Digital Item Declaration Language). In one embodiment, MCS 204 may categorize the Internet channel information, such as, for example, categorizing all music channels, sports channels, news channels, movie channels, comedy channels, etc. In one embodiment, MCS 204 may further categorize the Internet channel information, such as, for example, categorizing the music channels into rock music, rhythm and blues music, contemporary music, classical music, etc.

At 310, MCS 204 enables control point 208 to browse the Internet channel information received from channel service provider 112 using a browse channel method such as, but not limited to, UPnP™. In one embodiment, MCS 204 may receive a search query from control point 208 to browse for particular types of Internet channel information. For example, control point 208 may request all channels that play classical music or sports channels.

At 312, MCS 204 sends the requested channel information to control point 208 to enable a user of control point 208 to select a channel for media rendering at 312*a*. At 314, control point 208 sends the URI for the selected channel to media renderer 206.

At 316, media renderer 206 sends a request to media content provider 116 to obtain the desired media content using the URI received from control point 208. At 318, the media content is streamed from media content provider 116 to the appropriate rendering device (i.e., 210, 212, or 222) via media renderer 206.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A media channel service method for retrieving Internet channels comprising:

advertising services to a control point within a private network, wherein the control point sends and receives control actions and responses to operate rendering devices via a media renderer;

receiving a subscription identifier (ID) and a URI (Universal Resource Identifier) from the control point, wherein the subscription ID allows a channel service provider indicated by the URI to determine whether a valid subscription with the channel service provider exists;

requesting Internet channel information from at least one channel service provider; and if the subscription ID is valid, receiving the Internet channel information from the channel service provider, wherein the Internet channel information is provided to a user via the control point for enabling the user to browse the Internet channel information and request media content found on Internet channel information, wherein after the user selects a channel from which the media content is to be rendered, sending, by the control point, the URI for the selected Internet channel to a media renderer, wherein the media renderer requests the media content from a media content provider using the URI and wherein the media content is streamed from the media content provider to a rendering device in the private network via the media renderer.

2. The method of claim 1, wherein prior to providing the Internet channel information to the user via the control point, organizing the Internet channel information in an XML (eXtensible markup language) based format.

3. The method of claim 2, wherein the XML based format comprises a digital item declaration language (DIDL) format.

4. The method of claim 1, wherein prior to providing the Internet channel information to the user via the control point, categorizing the Internet channel information.

5. The method of claim 1, wherein a search query is provided by the user via the control point for browsing the Internet channel information.

6. The method of claim 1, wherein the private network comprises a home network.

7. An article comprising: a storage medium having a plurality of machine accessible instructions, wherein when the instructions are executed by a processor, the instructions provide for advertising services to a control point within a private network, wherein the control point sends and receives control actions and responses to operate rendering devices via a media renderer;

receiving a subscription identifier (ID) and a URI (Universal Resource Identifier) from the control point;

requesting Internet channel information from at least one channel service provider; and if the subscription ID is valid, receiving the Internet channel information from the channel service provider, wherein the Internet channel information is provided to a user via the control point for enabling the user to browse the Internet channel information and request media content found on Internet channel information, wherein after the user selects a channel from which the media content is to be rendered, sending, by the control point, the URI for the selected Internet channel to a media renderer, wherein the media renderer requests the media content from a media content provider using the URI and wherein the media content is streamed from the media content provider to a rendering device in the private network via the media renderer.

8. The article of claim 7, wherein prior to instructions for providing the Internet channel information to the user via the control point, the instructions provide for organizing the Internet channel information in an XML (eXtensible markup language) based format.

9. The article of claim 8, wherein the XML based format comprises a digital item declaration language (DIDL) format.

10. The article of claim 7, wherein prior to instructions for providing the Internet channel information to the user via the control point, the instructions provide for categorizing the Internet channel information.

11. The article of claim 7, wherein a search query is provided by the user via the control point for browsing the Internet channel information.

12. The article of claim 7, wherein the private network comprises a home network.

13. A channel distribution method comprising:

receiving a service advertisement from a media channel server, wherein the media channel sever acts as a gateway between one or more channel service providers and a plurality of rendering devices on a private network;

sending a subscription identifier (ID) and a URI (Universal Resource Identifier) to the media channel server, wherein the media channel server requests Internet channel information from the one or more channel service providers; and if the subscription identifier (ID) is validated by the one or more channel service providers, receiving Internet channel information from the one or more channel service providers via the media channel server, wherein the Internet channel information is provided to a user for enabling the user to browse the Internet channel information and request media content found on at least one Internet channel to be rendered on at least one of the plurality of rendering devices, wherein after the user browses the Internet channel information, enabling the user to select an Internet channel from which the media content is to be rendered; and sending the URI for the selected Internet channel to a media renderer, wherein the media renderer requests the media content from a media content provider using the URI and wherein the media content is streamed from the media content provider to a rendering device in the private network via the media renderer.

14. The method of claim 13, wherein the private network comprises a home network.

15. The method of claim 13, wherein the media channel server organizes the Internet channel information in an XML (eXtensible markup language) based format.

16. The method of claim 15, wherein the XML based format comprises a digital item declaration language (DIDL) format.

17. The method of claim 13, wherein the media channel server categorizes the Internet channel information.

18. An article comprising: a storage medium having a plurality of machine accessible instructions, wherein when the instructions are executed by a processor, the instructions provide for receiving a service advertisement from a media channel server, wherein the media channel server acts as a gateway between one or more channel service providers and a plurality of rendering devices on a private network;

sending a subscription identifier (ID) and a URI (Universal Resource Identifier) to the media channel server, wherein the media channel server requests Internet channel information from the one or more channel service providers; and if the subscription identifier (ID) is validated by the one or more channel service providers, receiving Internet channel information from the one or more channel service providers via the media channel server, wherein the Internet channel information is provided to a user for enabling the user to browse the Internet channel information and request media content found on at least one Internet channel to be rendered on at least one of the plurality of rendering devices, wherein after the user browses the Internet channel information, enabling the user to select an Internet channel from which the media content is to be rendered; and sending the URI for the selected Internet channel to a media renderer, wherein the media renderer requests the media content from a media content provider using the URI and wherein the media content is streamed from the media content provider to a rendering device in the private network via the media renderer.

19. The article of claim 18, wherein the private network comprises a home network.

20. The article of claim 18, wherein the media channel sever organizes the Internet channel information in an XML (eXtensible markup language) based format.

21. The article of claim 20, wherein the XML based format comprises a digital item declaration language (DIDL) format.

22. The article of claim 18, wherein the media channel server categorizes the Internet channel information.

* * * * *